US010356131B2

(12) United States Patent
Li et al.

(10) Patent No.: US 10,356,131 B2
(45) Date of Patent: Jul. 16, 2019

(54) SERVICE CHAINING FOR MULTIPLE UPLINK BRIDGES

(71) Applicant: Nutanix, Inc., San Jose, CA (US)

(72) Inventors: Uzui Li, Sunnyvale, CA (US); Miao Cui, New York, NY (US); Gregory A. Smith, Oakland, CA (US); Arunkumar Navasivasakthivelsamy, Redmond, WA (US)

(73) Assignee: NUTANIX, INC., San Jose, CA (US)

( * ) Notice: Subject to any disclaimer, the term of this patent is extended or adjusted under 35 U.S.C. 154(b) by 33 days.

(21) Appl. No.: 15/835,607

(22) Filed: Dec. 8, 2017

(65) Prior Publication Data
US 2018/0167419 A1 Jun. 14, 2018

Related U.S. Application Data

(60) Provisional application No. 62/432,126, filed on Dec. 9, 2016.

(51) Int. Cl.
*H04L 29/06* (2006.01)
*G06F 9/455* (2018.01)
(Continued)

(52) U.S. Cl.
CPC ........ *H04L 65/102* (2013.01); *G06F 9/45558* (2013.01); *H04L 12/46* (2013.01); *H04L 12/4625* (2013.01); *H04L 12/4633* (2013.01); *H04L 12/4637* (2013.01); *H04L 45/04* (2013.01); *H04L 45/10* (2013.01);
(Continued)

(58) Field of Classification Search
CPC ......... H04L 45/04; H04L 45/02; H04L 45/10; H04L 12/4637; H04L 12/46; H04L 12/4633; H04L 12/6418; H04L 63/00; H04L 65/102; H04L 63/0227; H04L 12/462; H04L 12/4625; H04L 12/66; G06F 2009/45595; G06F 9/45558; G06F 9/455

See application file for complete search history.

(56) References Cited

U.S. PATENT DOCUMENTS 8,601,473 B1 * 12/2013 Aron ................... G06F 9/45533 718/1
2011/0299413 A1 * 12/2011 Chatwani ............ H04L 12/4625 370/252

(Continued)

*Primary Examiner* — Mewale A Ambaye
(74) *Attorney, Agent, or Firm* — Foley & Lardner LLP

(57) ABSTRACT

A system and method for facilitating communication between one or more of a plurality of user virtual machines and external devices is disclosed. The system includes a plurality of uplink bridges configured to facilitate communication between the plurality of user virtual machines and the external devices, a plurality of local bridges, with each of the plurality of user virtual machines being connected to one or more of the plurality of local bridges, and a first multiplexing bridge connected to the plurality of local bridges. The first multiplexing bridge is configured to direct data between the plurality of user virtual machines and the plurality of uplink bridges. The system also includes a second multiplexing bridge connected to the first multiplexing bridge and the plurality of uplink bridges. The second multiplexing bridge is configured to direct the data between the first multiplexing bridge and the plurality of uplink bridges.

17 Claims, 6 Drawing Sheets

(51) Int. Cl.
*H04L 12/46* (2006.01)
*H04L 12/715* (2013.01)
*H04L 12/751* (2013.01)
*H04L 12/64* (2006.01)

(52) U.S. Cl.
CPC ...... *H04L 63/0227* (2013.01); *H04L 65/1069* (2013.01); *G06F 2009/45595* (2013.01); *H04L 12/6418* (2013.01); *H04L 45/02* (2013.01)

(56) References Cited

U.S. PATENT DOCUMENTS

| | | | |
|---|---|---|---|
| 2012/0063306 A1* | 3/2012 | Sultan | H04L 12/4625 370/230 |
| 2013/0044641 A1* | 2/2013 | Koponen | H04L 12/66 370/255 |
| 2014/0092907 A1* | 4/2014 | Sridhar | H04L 45/74 370/392 |
| 2015/0103841 A1* | 4/2015 | Yang | H04L 45/586 370/401 |
| 2016/0119219 A1* | 4/2016 | Fang | H04L 45/02 370/392 |
| 2017/0118043 A1* | 4/2017 | Hao | H04L 12/4633 |
| 2017/0324645 A1* | 11/2017 | Johnsen | H04L 47/20 |

\* cited by examiner

SERVICE CHAINING FOR MULTIPLE UPLINK BRIDGES

CROSS REFERENCE TO RELATED PATENT APPLICATIONS

This application is a Non-Provisional Application of U.S. Provisional Application No. 62/432,126, filed on Dec. 9, 2016, the entirety of which is incorporated by reference herein.

TECHNICAL FIELD

This disclosure generally relates to managing network traffic.

BACKGROUND

A virtual machine ("VM") can refer to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments to not only utilize the processing power of the physical devices to aggregate the storage of the individual physical devices to create a logical storage pool wherein the data can be distributed across the physical devices but appears to the virtual machines to be part of the system that the virtual machine is hosted on. Such systems operate under the covers by using metadata, which can be distributed and replicated any number of times across the system, to locate the indicated data. These systems are commonly referred to as clustered systems, wherein the resources of the group are pooled to provide logically combined, but physically separate systems.

SUMMARY

In accordance with one aspect of the present disclosure, a system is disclosed. The system includes a plurality of host machines in a virtualization environment, and each of the plurality of host machines includes a plurality of user virtual machines. The system also includes a plurality of uplink bridges configured to facilitate communication between the plurality of user virtual machines and external devices, a plurality of local bridges, such that each of the plurality of user virtual machines is connected to one or more of the plurality of local bridges, and a first multiplexing bridge connected to the plurality of local bridges. The first multiplexing bridge is configured to direct data between the plurality of user virtual machines and the plurality of uplink bridges. The system also includes a second multiplexing bridge connected to the first multiplexing bridge and the plurality of uplink bridges. The second multiplexing bridge is configured to direct the data between the first multiplexing bridge and the plurality of uplink bridges.

In accordance with another aspect of the present disclosure, a method is disclosed. The method includes facilitating communication between a plurality of user virtual machines and a plurality of external devices via a plurality of uplink bridges. The plurality of user virtual machines reside on a host machine within a virtualization environment, and wherein the communication between the plurality of user virtual machines and the plurality of uplink bridges occurs by transmitting first data from one or more of the plurality of user virtual machines to one or more of a plurality of local bridges. The method also includes combining the first data from all of the plurality of local bridges in a first multiplexing bridge for obtaining combined first data, applying first network rules and network functions to the combined first data, and splitting the combined first data in a second multiplexing bridge for obtaining individual first data. The method additionally includes transferring each of the individual first data to one or more of the plurality of uplink bridges and transmitting the individual first data from the one or more of the plurality of uplink bridges to the external devices connected to the one or more of the plurality of uplink bridges.

In accordance with yet another aspect of the present disclosure, a non-transitory computer readable media is disclosed. The non-transitory computer readable media includes computer-executable instructions embodied thereon that, when executed by a processor of a virtualization environment, causes the processor to perform a process. The process includes facilitating communication between a plurality of user virtual machines and a plurality of external devices via a plurality of uplink bridges. The plurality of user virtual machines reside on a host machine within a virtualization environment, and the communication between the plurality of user virtual machines and the plurality of uplink bridges occurs by transmitting first data from one or more of the plurality of user virtual machines to one or more of a plurality of local bridges. The process also includes combining the first data from all of the plurality of local bridges in a first multiplexing bridge for obtaining combined first data, applying first network rules and network functions to the combined first data, and splitting the combined first data in a second multiplexing bridge for obtaining individual first data. The process further includes transferring each of the individual first data to one or more of the plurality of uplink bridges and transmitting the individual first data from the one or more of the plurality of uplink bridges to the external devices connected to the one or more of the plurality of uplink bridges.

The foregoing summary is illustrative only and is not intended to be in any way limiting. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

This disclosure is directed to implementing service chaining for multiple uplink bridges in a virtualization environment. Particular embodiments can construct a chain of service-focused bridges in order to abstract services within an infrastructure comprising multiple uplink bridges. The chain of bridges can comprise: a plurality of local bridges for handling network traffic coming from and going to a plurality of clients (e.g., VMs), a first multiplexing bridge to combine traffic going from the local bridges to the service-focused bridges (and split traffic going from the service-focused bridges to the local bridges), one or more service-focused bridges (e.g., to handle enforcement and management of network security rules, or to direct traffic to/from different network functions), a second multiplexing bridge to combine traffic going from the service-focused bridges to the uplink bridges (and split traffic going from the uplink bridges to the service-focused bridges), and a plurality of uplink bridges for handling outgoing and incoming network traffic exchanged with a plurality of external servers. In particular embodiments, the service-focused bridges can include a bridge providing logic to filter traffic based on configurable network security rules. In particular embodiments, the service-focused bridges can include a bridge providing logic to direct traffic to and from different network functions (e.g., provided by one or more network function VMs).

Figure 1A:
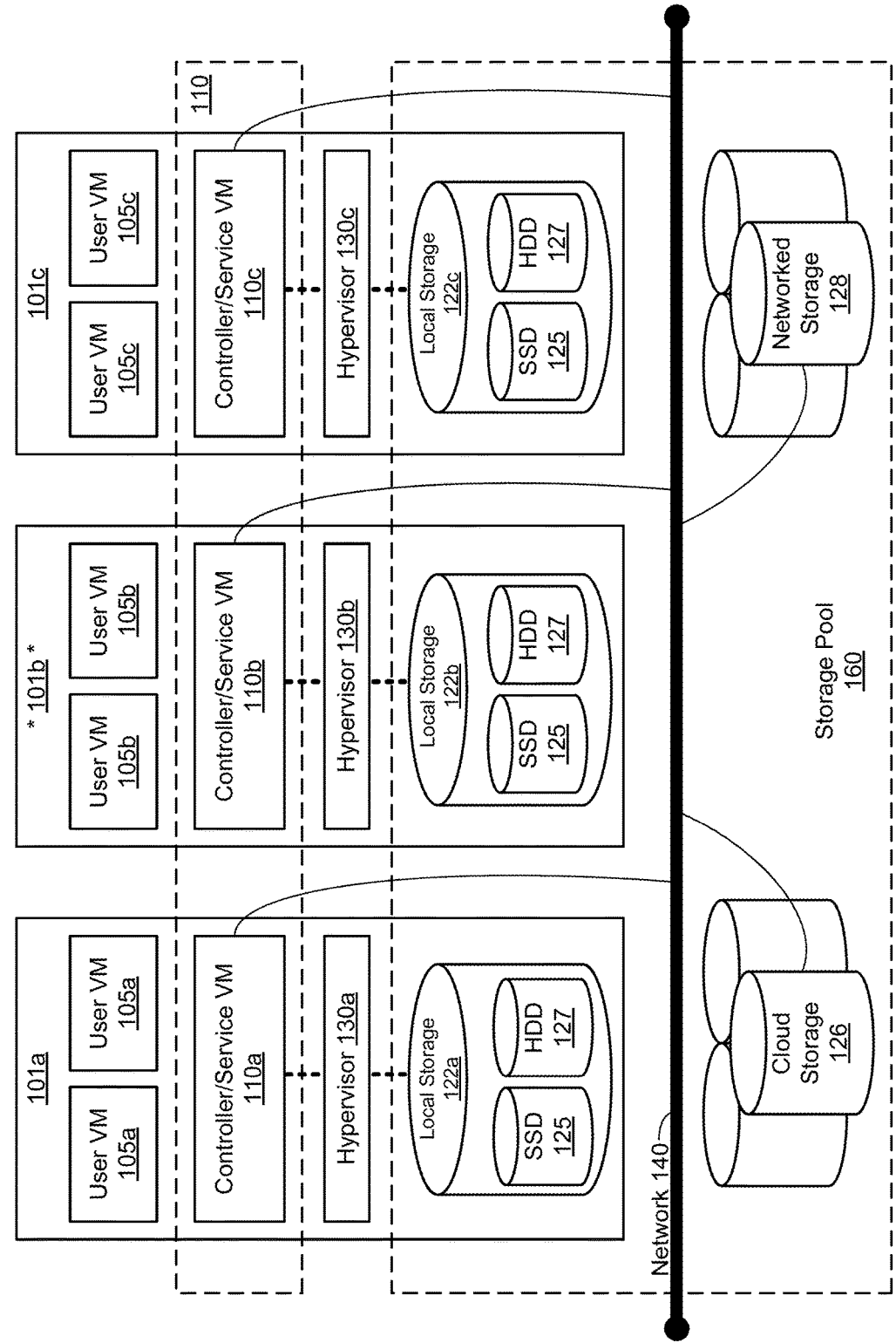
FIG. 1A is a clustered virtualization environment according to particular embodiments.

FIG. 1A illustrates a clustered virtualization environment 100, in accordance with some embodiments of the present disclosure. The virtualization environment 100 can be implemented for a distributed platform that contains multiple host machines 101a-c that manage multiple tiers of storage. The multiple tiers of storage can include storage that is accessible through network 140, such as, by way of example and not limitation, cloud storage 126 (e.g., which can be accessible through the Internet), network-attached storage (NAS) 128 (e.g., which can be accessible through a LAN), or a storage area network (SAN). Unlike the prior art, the present embodiment also permits local storage 122a-c that is incorporated into or directly attached to the host machine and/or appliance to be managed as part of storage pool 160. Examples of such local storage include Solid State Drives 125 (henceforth "SSDs"), Hard Disk Drives 127 (henceforth "HDDs" or "spindle drives"), optical disk drives, external drives (e.g., a storage device connected to a host machine via a native drive interface or a serial attached SCSI interface), or any other direct-attached storage. These storage devices, both direct-attached and network-accessible, collectively form storage pool 160. Virtual disks (or "vDisks") can be structured from the physical storage devices in storage pool 160, as described in more detail below. As used herein, the term vDisk refers to the storage abstraction that is exposed by a Controller/Service VM (CVM) 110a-110c to be used by user VMs 105a-105c. In particular embodiments, the vDisk can be exposed via iSCSI ("internet small computer system interface") or NFS ("network file system") and is mounted as a virtual disk on the user VM. In particular embodiments, vDisks can be organized into one or more volume groups (VGs).

Each host machine 101a-c can run virtualization software, such as VMWARE ESX(I), MICROSOFT HYPER-V, or REDHAT KVM. The virtualization software includes hypervisor 130a-130c to create, manage, and destroy user VMs 105a-105c, as well as managing the interactions between the underlying hardware and user VMs 105a-105c. User VMs 105a-105c can run one or more applications that can operate as "clients" with respect to other elements within virtualization environment 100. Though not depicted in FIG. 1A, a hypervisor can connect to network 140. In particular embodiments, a host machine 101 can be a physical hardware computing device; in particular embodiments, a host machine 101 can be a virtual machine.

CVMs 110a-110c are used to manage storage and input/output ("I/O") activities according to particular embodiments. These special VMs act as the storage controller in the currently described architecture. Multiple such storage controllers can coordinate within a cluster to form a unified storage controller system. CVMs 110a-110c can run as virtual machines on the various host machines 101a-101c, and work together to form a distributed system 110 that manages all the storage resources, including local storage 122, NAS 128, and cloud storage 126. CVMs 110a-110c can connect to network 140 directly, or via the hypervisor. Since the CVMs run independent of hypervisors 130a-130c, this means that the current approach can be used and implemented within any virtual machine architecture, since the CVMs of particular embodiments can be used in conjunction with any hypervisor from any virtualization vendor.

A host machine can be designated as a leader node within a cluster of host machines. For example, host machine 101b, as indicated by the asterisks, can be a leader node. A leader node can have a software component designated to perform operations of the leader. For example, CVM 110b on host machine 101b can be designated to perform such operations. A leader can be responsible for monitoring or handling requests from other host machines or software components on other host machines throughout the virtualized environment. If a leader fails, a new leader can be designated. In particular embodiments, a management module (e.g., in the form of an agent) can be running on the leader node.

Each CVM 110a-110c exports one or more block devices or NFS server targets that appear as disks to user VMs 105a-105c. These disks are virtual, since they are implemented by the software running inside CVMs 110a-110c. Thus, to user VMs 105a-105c, CVMs 110a-110c appear to be exporting a clustered storage appliance that contains some disks. All user data (including the operating system) in the user VMs 105a-105c reside on these virtual disks.

Significant performance advantages can be gained by allowing the virtualization system to access and utilize local storage 122 as disclosed herein. This is because I/O performance is typically much faster when performing access to local storage 122 as compared to performing access to NAS 128 across network 140. This faster performance for locally attached storage 122 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
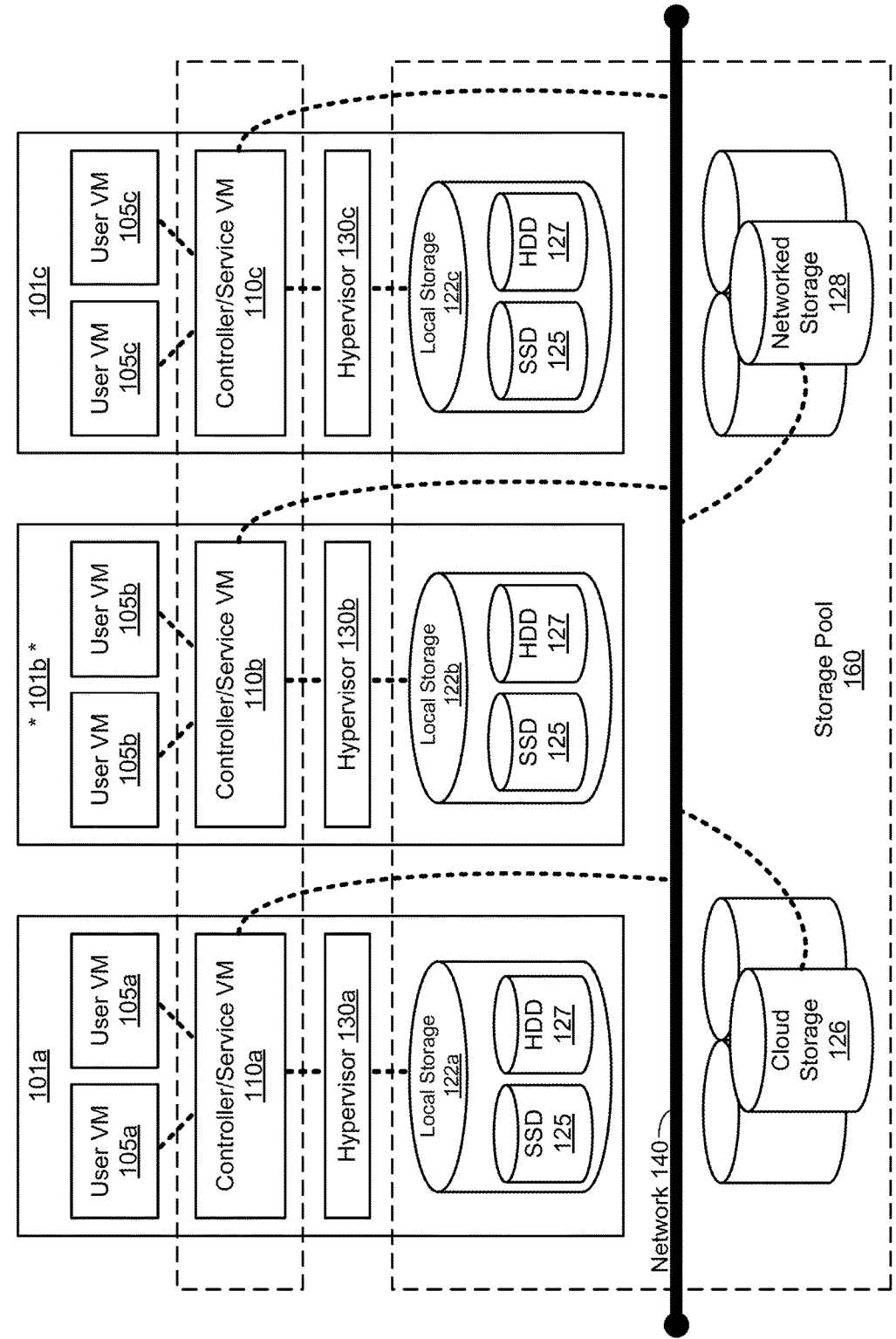
FIG. 1B is a data flow within the clustered virtualization environment of FIG. 1A according to particular embodiments.

FIG. 1B illustrates data flow within an example clustered virtualization environment 100 according to particular embodiments. As described above, one or more user VMs and a CVM can run on each host machine 101a-101c along with hypervisor 130a-130c. As a user VM performs I/O operations (e.g., a read operation or a write operation), the I/O commands of the user VM can be sent to the hypervisor that shares the same server as the user VM. For example, the hypervisor can present to the virtual machines an emulated storage controller, receive an I/O command and facilitate the performance of the I/O command (e.g., via interfacing with storage that is the object of the command, or passing the command to a service that will perform the I/O command). An emulated storage controller can facilitate I/O operations between a user VM and a vDisk. A vDisk can present to a user VM as one or more discrete storage drives, but each vDisk can correspond to any part of one or more drives within storage pool 160. Additionally or alternatively, CVM 110a-110c can present an emulated storage controller either to the hypervisor or to user VMs to facilitate I/O operations. CVM 110a-110c can be connected to storage within storage pool 160. CVM 110a can have the ability to perform I/O operations using local storage 122a within the same host machine 101a, by connecting via network 140 to cloud storage 126 or NAS 128, or by connecting via network 140 to local storage 122b-c within another host machine 101b-110c (e.g., via connecting to another CVM 110b or 110c). In particular embodiments, any suitable computing system 400 can be used to implement a host machine 101.

Figure 2A:
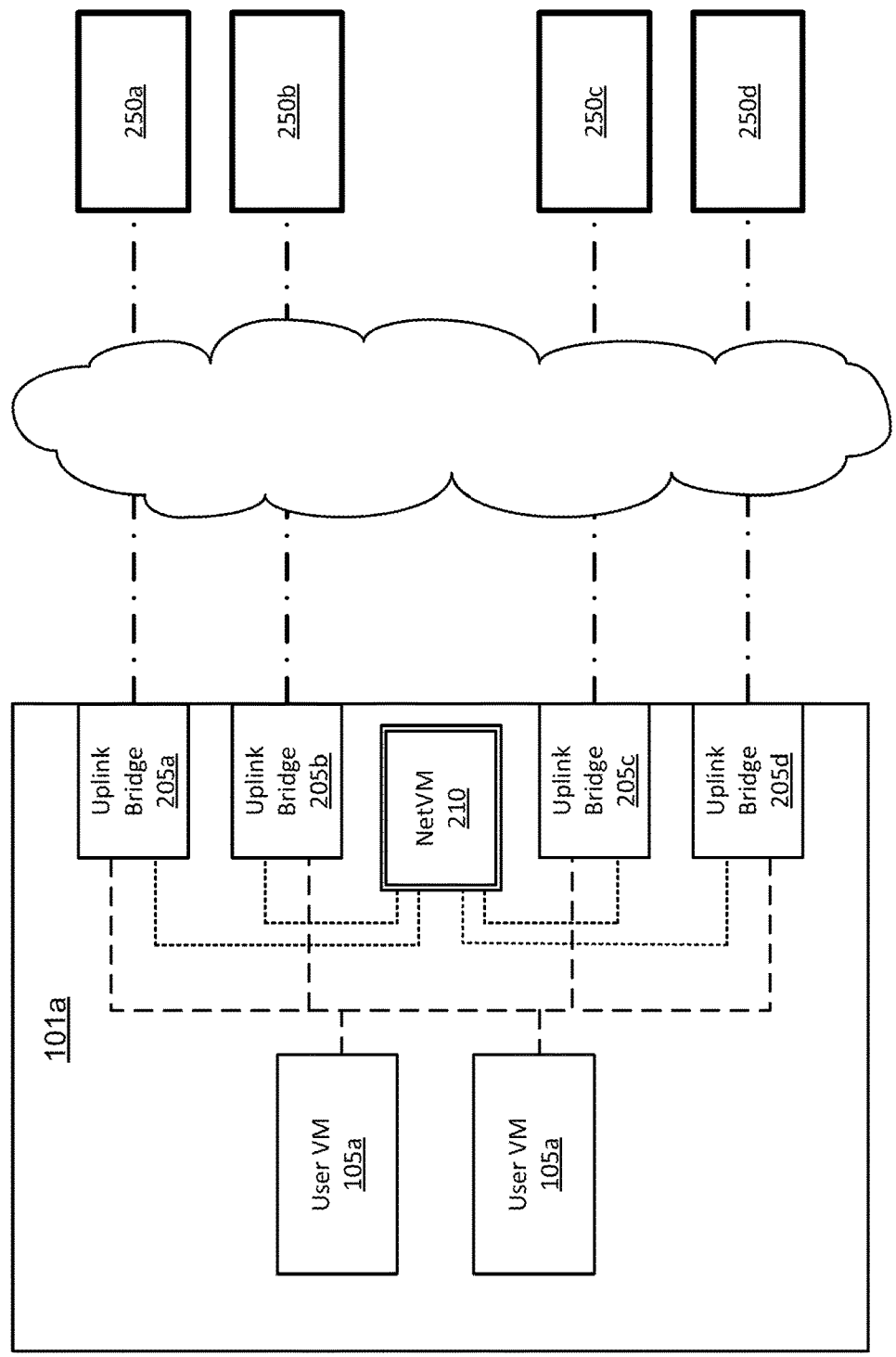
FIG. 2A is a block diagram showing network traffic that utilizes multiple uplink bridges according to particular embodiments.

FIG. 2A is a block diagram showing network traffic in particular embodiments utilizing multiple uplink bridges. An uplink bridge is used to facilitate communication between one or more of the user VMs 105a and the external devices (e.g., external servers). In some embodiments, a plurality of uplink bridges 205a-205d in host machine 101a direct traffic to and from external servers 250a-250d (e.g., which can provide services to user VMs 105a). Multiple uplink bridges can be desirable (e.g., in order to isolate traffic sent between host machine 101a and each external server 250). In particular embodiments, one or more NetVMs 210 can provide certain network functions, such as, by way of example and not limitation, firewall services, load balancing, or traffic analytics. In particular embodiments, a NetVM 210 acts as a gatekeeper to permit or block (e.g., as would be appropriate for functions such as firewall services or load balancing) network traffic between the user VMs 105a and the external servers 250a-250d. In particular embodiments, NetVMs 210 can passively (e.g., in the background) monitor the traffic (e.g., as would be appropriate for functions such as traffic analytics). NetVM 210 also provide a network interface ("NIC") for each of the uplink bridges 205a-205d, and the NIC is reserved on each of the uplink bridges for NetVM, which may be cumbersome.

Figure 2B:
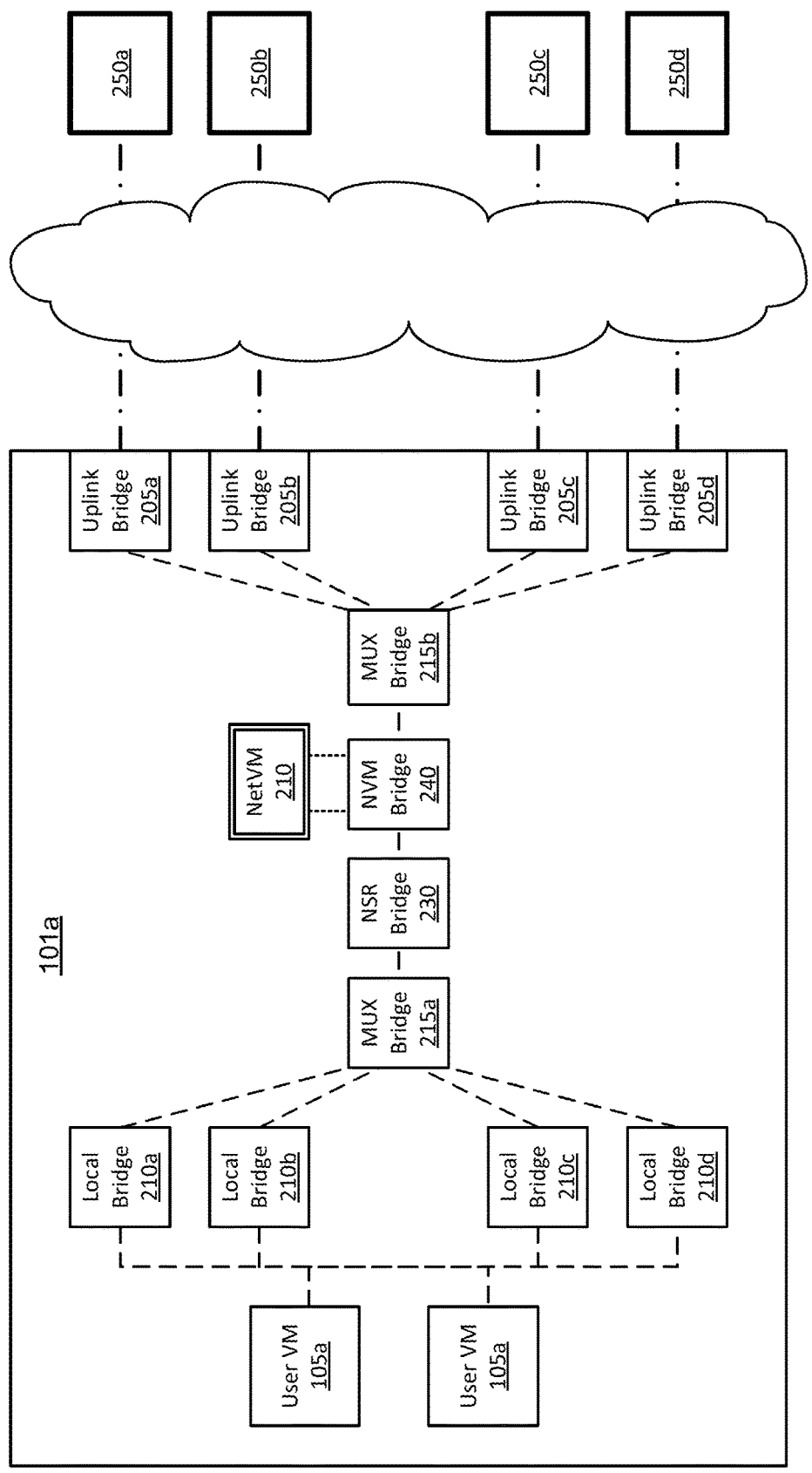
FIG. 2B is a block diagram showing the network traffic of FIG. 2A in greater detail.

FIG. 2B illustrates network traffic in particular embodiments chaining multiple bridges. Particular embodiments provide an architecture for implementing service chaining for multiple uplink bridges in a virtualization environment. Particular embodiments can construct a chain of service-focused bridges (e.g., a network security rules ("NSR") bridge 230 and network function ("NVM") bridge 240) in order to abstract services within an infrastructure comprising multiple uplink bridges 205a-205d. The chain of bridges can comprise: a plurality of local bridges 210a-210d for handling network traffic coming from and going to a plurality of clients (e.g., VMs), a first multiplexing bridge 215a to combine traffic going from the local bridges to the service-focused bridges (and split traffic going from the service-focused bridges to the local bridges), one or more service-focused bridges (e.g., NSR Bridge 230, which handles enforcement and management of network security rules, and NVM Bridge 240, which directs traffic to/from different network functions, such as NetVM 210), a second multiplexing bridge 215b to combine traffic going from the service-focused bridges to the uplink bridges 205a-d (and split traffic going from the uplink bridges to the service-focused bridges), and a plurality of uplink bridges 205a-d for handling outgoing and incoming network traffic exchanged with a plurality of external servers. In particular embodiments, the service-focused bridges can include NSR Bridge 230, which provides logic to filter traffic based on configurable network security rules. In particular embodiments, the service-focused bridges can include NVM Bridge 240, which provides logic to direct traffic to and from different network functions (e.g., provided by one or more NetVMs 210). As shown in FIG. 2B, each uplink bridge 205 can have a corresponding local bridge 210.

Thus, a chain is formed between each user VM 105a and the uplink bridges 205a-205d via first multiplexing bridge 215a, NSR bridge 230, NVM bridge 240, and second multiplexing bridge 215b. Network traffic going to and from each of the user VMs 205a follows the same bridge chain regardless of which local bridge 210a-210d that particular user VM is connected to.

Figure 3:
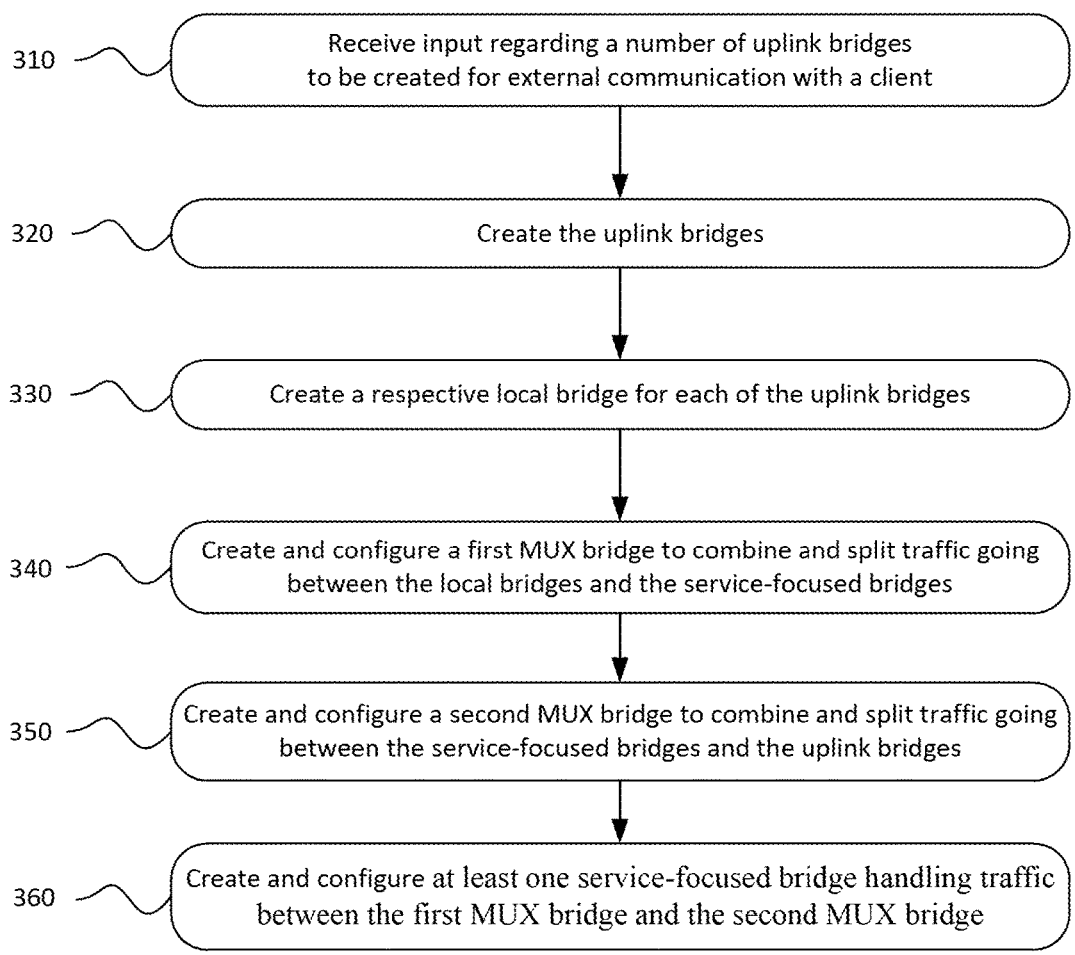
FIG. 3 is an example method outlining operations for implementing service chaining for multiple uplink bridges in a virtualization environment according to particular embodiments.

FIG. 3 illustrates an example method 300 for implementing service chaining for multiple uplink bridges in a virtualization environment. Input can be received (310) regarding a number of uplink bridges to be created for external communication with a client. Based on the input, the uplink bridges can be created (320) to transmit and receive traffic between the service-focused bridges and the external servers or services. A respective local bridge can be created (330) for each of the uplink bridges, wherein the local bridges transmit and receive traffic between the clients and the service-focused bridges. A first multiplexing bridge can be created and configured (340) to combine and split traffic going between the local bridges and the service-focused bridges. A second multiplexing bridge can be created and configured (350) to combine and split traffic going between the service-focused bridges and the uplink bridges. One or more service-focused bridges can be created (360) to moderate, monitor, and/or modify traffic between the first multiplexing bridge and the second multiplexing bridge.

In operation, to transfer data between user VMs 105 and uplink bridges 205a-205d, the user VMs send the data (or other piece of information that the user VM is trying to communicate) to one or more of the plurality of local bridges 210a-210d to which the user VMs are connected. The plurality of local bridges 210a-210d in turn transfer the data to first multiplexing bridge 215a, which combines the data from each of the plurality of local bridges into combined data. The NSR bridge 230 and NVM bridge 240 then apply one or more rules and network functions on the combined data before the data is split into individual pieces of data by second multiplexing bridge 215b. In some embodiments, the individual pieces of data may have changed somewhat from the original data transmitted by user VMS 105a due to the one or more rules and network functions that are applied on the combined data. In other embodiments, the individual pieces of data may be same or substantially same as the original data. The second multiplexing bridge 215b may then transmit the individual pieces of data to respective uplink bridges 205a-205d, which in turn may transfer the data to the respective external servers 250a-250d to which the uplink bridge is connected.

Likewise, to send data (or other information) from external servers 250a-250d to user VMs 105a, external servers may transmit the data to the respective uplink bridges 205a-205d. Data from all uplink bridges 205a-205d may be combined into combined data in second multiplexing bridge 215b. One or more rules and network functions may be applied to the combined data before the combined data is split into individual pieces of data by first multiplexing bridge 215a. The individual pieces of data are then transferred to the respective plurality of local bridges 210a-210d for transfer to user VMs 105a connected thereto.

Figure 4:
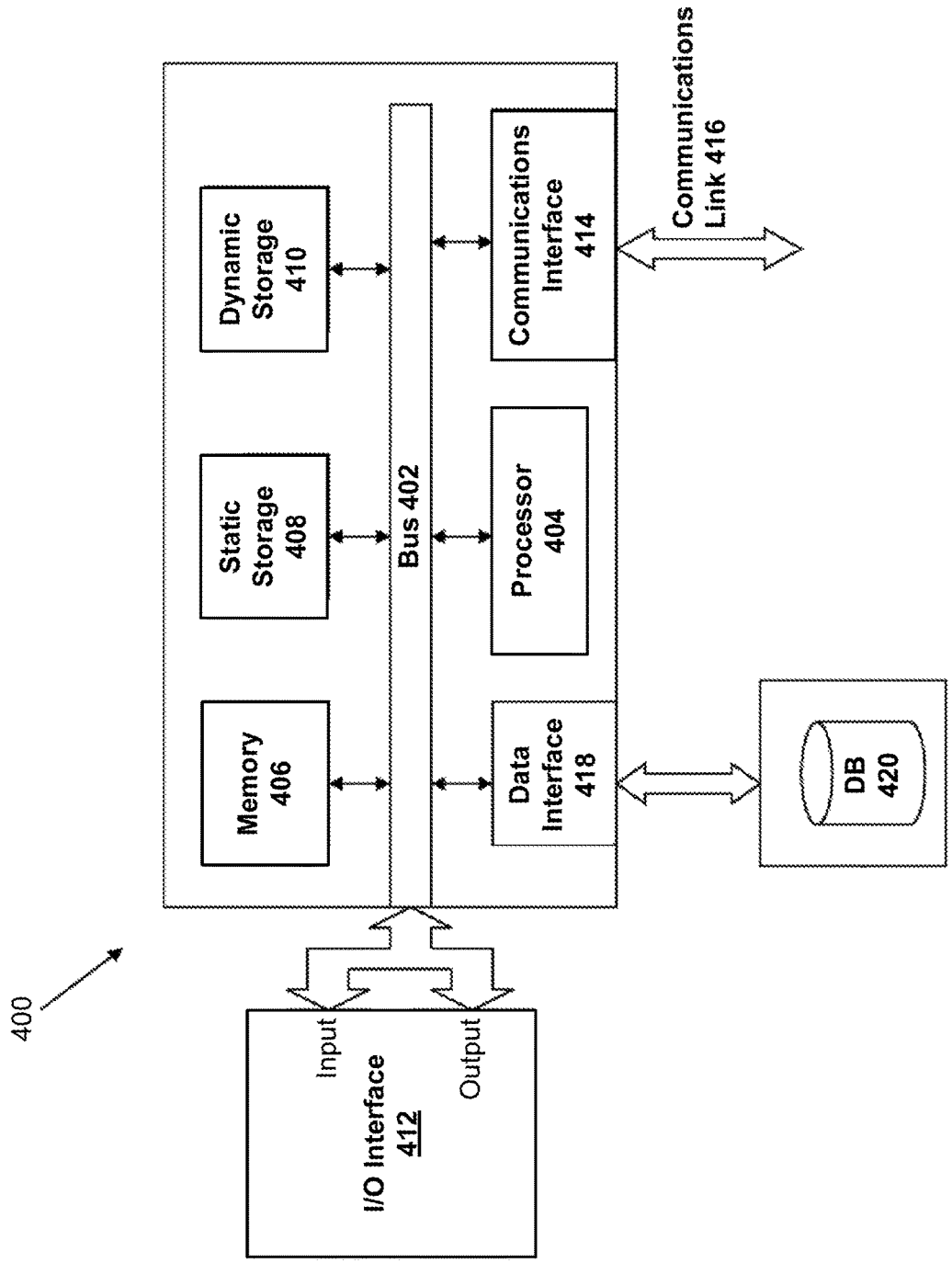
FIG. 4 is a block diagram of a computing system suitable for implementing particular embodiments disclosed herein.

FIG. 4 is a block diagram of an illustrative computing system 400 suitable for implementing particular embodiments. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system can encompass a computing device, and vice versa, where appropriate. Moreover, reference to a computer system can encompass one or more computer systems, where appropriate.

This disclosure contemplates any suitable number of computer systems 400. This disclosure contemplates computer system 400 taking any suitable physical form. As example and not by way of limitation, computer system 400 can be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 400 can include one or more computer systems 400; be unitary or distributed; span multiple locations; span multiple machines; span multiple data centers; or reside in a cloud, which can include one or more cloud components in one or more networks. Where appropriate, one or more computer systems 400 can perform without substantial spatial or temporal limitation one or more steps of one or more methods described or illustrated herein. As an example and not by way of limitation, one or more computer systems 400 can perform in real time or in batch mode one or more steps of one or more methods described or illustrated herein. One or more computer systems 400 can perform at different times or at different locations one or more steps of one or more methods described or illustrated herein, where appropriate.

Computer system 400 includes a bus 402 (e.g., an address bus and a data bus) or other communication mechanism for communicating information, which interconnects subsystems and devices, such as processor 404, memory 406 (e.g., RAM), static storage 408 (e.g., ROM), dynamic storage 410 (e.g., magnetic or optical), communication interface 414 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 412 (e.g., keyboard, keypad, mouse, microphone). In particular embodiments, computer system 400 can include one or more of any such components.

In particular embodiments, processor 404 includes hardware for executing instructions, such as those making up a computer program. As an example and not by way of limitation, to execute instructions, processor 404 can retrieve (or fetch) the instructions from an internal register, an internal cache, memory 406, static storage 408, or dynamic storage 410; decode and execute them; and then write one or more results to an internal register, an internal cache, memory 406, static storage 408, or dynamic storage 410. In particular embodiments, processor 404 can include one or more internal caches for data, instructions, or addresses. This disclosure contemplates processor 404 including any suitable number of any suitable internal caches, where appropriate. As an example and not by way of limitation, processor 404 can include one or more instruction caches, one or more data caches, and one or more translation lookaside buffers (TLBs). Instructions in the instruction caches can be copies of instructions in memory 406, static storage 408, or dynamic storage 410, and the instruction caches can speed up retrieval of those instructions by processor 404. Data in the data caches can be copies of data in memory 406, static storage 408, or dynamic storage 410 for instructions executing at processor 404 to operate on; the results of previous instructions executed at processor 404 for access by subsequent instructions executing at processor 404 or for writing to memory 406, static storage 408, or dynamic storage 410; or other suitable data. The data caches can speed up read or write operations by processor 404. The TLBs can speed up virtual-address translation for processor 404. In particular embodiments, processor 404 can include one or more internal registers for data, instructions, or addresses. This disclosure contemplates processor 404 including any suitable number of any suitable internal registers, where appropriate. Where appropriate, processor 404 can include one or more arithmetic logic units (ALUs); be a multi-core processor; or include one or more processors 402. Although this disclosure describes and illustrates a particular processor, this disclosure contemplates any suitable processor.

In particular embodiments, I/O interface 412 includes hardware, software, or both, providing one or more interfaces for communication between computer system 400 and one or more I/O devices. Computer system 400 can include one or more of these I/O devices, where appropriate. One or more of these I/O devices can enable communication between a person and computer system 400. As an example and not by way of limitation, an I/O device can include a keyboard, keypad, microphone, monitor, mouse, printer, scanner, speaker, still camera, stylus, tablet, touch screen, trackball, video camera, another suitable I/O device or a combination of two or more of these. An I/O device can include one or more sensors. This disclosure contemplates any suitable I/O devices and any suitable I/O interfaces 412 for them. Where appropriate, I/O interface 412 can include one or more device or software drivers enabling processor 404 to drive one or more of these I/O devices. I/O interface 412 can include one or more I/O interfaces 412, where appropriate. Although this disclosure describes and illustrates a particular I/O interface, this disclosure contemplates any suitable I/O interface.

In particular embodiments, communication interface 414 includes hardware, software, or both providing one or more interfaces for communication (such as, for example, packet-based communication) between computer system 400 and one or more other computer systems 400 or one or more networks. As an example and not by way of limitation, communication interface 414 can include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 414 for it. As an example and not by way of limitation, computer system 400 can communicate with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, computer system 400 can communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 can include any suitable communication interface 414 for any of these networks, where appropriate. Communication interface 414 can include one or more communication interfaces 414, where appropriate. Although this disclosure describes and illustrates a particular communication interface, this disclosure contemplates any suitable communication interface.

One or more memory buses (which can each include an address bus and a data bus) can couple processor 404 to memory 406. Bus 402 can include one or more memory buses, as described below. In particular embodiments, one or more memory management units (MMUs) reside between processor 404 and memory 406 and facilitate accesses to memory 406 requested by processor 404. In particular embodiments, memory 406 includes random access memory (RAM). This RAM can be volatile memory, where appropriate Where appropriate, this RAM can be dynamic RAM (DRAM) or static RAM (SRAM). Moreover, where appropriate, this RAM can be single-ported or multi-ported RAM. This disclosure contemplates any suitable RAM. Memory 406 can include one or more memories 406, where appropriate. Although this disclosure describes and illustrates particular memory, this disclosure contemplates any suitable memory.

Where appropriate, the ROM can be mask-programmed ROM, programmable ROM (PROM), erasable PROM (EPROM), electrically erasable PROM (EEPROM), electrically alterable ROM (EAROM), or flash memory or a combination of two or more of these. In particular embodiments, dynamic storage 410 can include a hard disk drive (HDD), a floppy disk drive, flash memory, an optical disc, a magneto-optical disc, magnetic tape, or a Universal Serial Bus (USB) drive or a combination of two or more of these. Dynamic storage 410 can include removable or non-removable (or fixed) media, where appropriate. Dynamic storage 410 can be internal or external to computer system 400, where appropriate. This disclosure contemplates mass dynamic storage 410 taking any suitable physical form. Dynamic storage 410 can include one or more storage control units facilitating communication between processor 404 and dynamic storage 410, where appropriate.

In particular embodiments, bus 402 includes hardware, software, or both coupling components of computer system 400 to each other. As an example and not by way of limitation, bus 402 can include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 402 can include one or more buses 406, where appropriate. Although this disclosure describes and illustrates a particular bus, this disclosure contemplates any suitable bus or interconnect.

According particular embodiments, computer system 400 performs specific operations by processor 404 executing one or more sequences of one or more instructions contained in memory 406. Such instructions can be read into memory 406 from another computer readable/usable medium, such as static storage 408 or dynamic storage 410. In alternative embodiments, hard-wired circuitry can be used in place of or in combination with software instructions to implement particular embodiments. Thus, particular embodiments are not limited to any specific combination of hardware circuitry and/or software. In particular embodiments, the term "logic" shall mean any combination of software or hardware that is used.

The term "computer readable medium" or "computer usable medium" as used herein refers to any medium that participates in providing instructions to processor 404 for execution. Such a medium can take many forms, including but not limited to, nonvolatile media and volatile media. Non-volatile media includes, for example, optical or magnetic disks, such as static storage 408 or dynamic storage 410. Volatile media includes dynamic memory, such as memory 406.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions can be performed by a single computer system 400; in alternative embodiments, two or more computer systems 400 coupled by communication link 416 (e.g., LAN, PTSN, or wireless network) can perform the sequence of instructions in coordination with one another.

Computer system 400 can transmit and receive messages, data, and instructions, including program, i.e., application code, through communication link 416 and communication interface 414. Received program code can be executed by processor 404 as it is received, and/or stored in static storage 408 or dynamic storage 410, or other non-volatile storage for later execution. A database 420 can be used to store data accessible by the system 400 by way of data interface 418.

Herein, a computer-readable non-transitory storage medium or media can include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium can be volatile, non-volatile, or a combination of volatile and non-volatile, where appropriate.

It is also to be understood that in some embodiments, any of the operations described herein can be implemented at least in part as computer-readable instructions stored on a computer-readable memory. Upon execution of the computer-readable instructions by a processor, the computer-readable instructions can cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or can be acquired from practice of the disclosed embodiments. It is intended that the scope of the invention be defined by the claims appended hereto and their equivalents.

What is claimed is:

1. A system comprising:
an uplink bridge to facilitate communication between a client and an external device;
a local bridge connected to the client to send data from the client to the uplink bridge and from the uplink bridge to the client;
a first multiplexing bridge between the local bridge and the uplink bridge to direct the data from the local bridge to the uplink bridge and from the uplink bridge to the local bridge;
a second multiplexing bridge connected to the first multiplexing bridge and the uplink bridge to direct the data from the first multiplexing bridge to the uplink bridge and from the uplink bridge to the first multiplexing bridge; and
a network security rules bridge between the first multiplexing bridge and the second multiplexing bridge to filter the data based on a defined rule.

2. The system of claim 1, further comprising a network function bridge between the network security rules bridge and the second multiplexing bridge to direct the data between a network function.

3. The system of claim 1, wherein the first multiplexing bridge combines the data received from the local bridge and other local bridges.

4. The system of claim 1, wherein the first multiplexing bridge splits the data received from the uplink bridge and other uplink bridges.

5. The system of claim 1, wherein the second multiplexing bridge combines the data received from the uplink bridge and other uplink bridges.

6. The system of claim 1, wherein the second multiplexing bridge splits the data received from the first multiplexing bridge.

7. The system of claim 1, further comprising a plurality of local bridges and a plurality of uplink bridges, and wherein a number of the plurality of local bridges is equal to a number of the plurality of uplink bridges.

8. A method comprising:
transmitting first data from a client to a local bridge connected to the client;
combining the first data from the local bridge with another data from another local bridge in a first multiplexing bridge for obtaining combined first data;
splitting the combined first data in a second multiplexing bridge for obtaining individual first data and individual another data;
transferring the individual first data to an uplink bridge;
transmitting the individual first data from the uplink bridge to an external device; and
applying a first network rule to the combined first data via a network security rules bridge between the first multiplexing bridge and the second multiplexing bridge.

9. The method of claim 8, further comprising:
receiving a second data from the uplink bridge;
combining the second data with third data into combined second data in the second multiplexing bridge;
splitting the combined second data into individual second data and individual third data in the first multiplexing device;
transferring the individual second data to local bridge; and
transmitting the individual second data from the local bridge to the client.

10. The method of claim 9, further comprising applying a second network rule to the combined second data via a network security rules bridge between the first multiplexing bridge and the second multiplexing bridge.

11. The method of claim 8, further comprising creating the uplink bridge based upon an input request.

12. The method of claim 8, further comprising a plurality of local bridges and a plurality of uplink bridges, and wherein a number of the plurality of local bridges is equal to a number of the plurality of uplink bridges.

13. The method of claim 12, wherein each of the plurality of uplink bridges is connected to one external device.

14. The method of claim 8, wherein a bridge chain is formed between the client and the uplink bridge for transmitting the first data from the client to the external device.

15. A non-transitory computer readable media with computer-executable instructions embodied thereon that, when executed by a processor causes the processor to perform a process comprising:
transmitting first data from a client to a local bridge connected to the client;
combining the first data from the local bridge with another data from another local bridge in a first multiplexing bridge for obtaining combined first data;
splitting the combined first data in a second multiplexing bridge for obtaining individual first data and individual another data;
transferring the individual first data to an uplink bridge;
transmitting the individual first data from the uplink bridge to an external device; and
applying a first network rule on the combined first data and applying a second network rule on the combined second data via a network security rules bridge between the first multiplexing bridge and the second multiplexing bridge.

16. The non-transitory computer readable media of claim 15, further comprising:
receiving a second data from the uplink bridge;
combining the second data with third data into combined second data in the second multiplexing bridge;
splitting the combined second data into individual second data and individual third data in the first multiplexing device;
transferring the individual second data to the local bridge; and
transmitting the individual second data from the local bridge to the client.

17. The non-transitory computer readable media of claim 15, further comprising connecting a network function bridge between a network security rules bridge and the second multiplexing bridge for directing the combined first data between a network function.

* * * * *